United States Patent
Tabelander

(10) Patent No.: US 11,898,914 B2
(45) Date of Patent: Feb. 13, 2024

(54) TEMPERATURE DETERMINATION DEVICE

(71) Applicant: ABB Schweiz AG, Baden (CH)

(72) Inventor: Stefan Tabelander, Herford (DE)

(73) Assignee: ABB Schweiz AG, Baden (CH)

(*) Notice: Subject to any disclaimer, the term of this patent is extended or adjusted under 35 U.S.C. 154(b) by 530 days.

(21) Appl. No.: 17/115,823

(22) Filed: Dec. 9, 2020

(65) Prior Publication Data

US 2021/0181034 A1 Jun. 17, 2021

(30) Foreign Application Priority Data

Dec. 11, 2019 (EP) .................................... 19215337

(51) Int. Cl.
*G01K 3/00* (2006.01)
*G01K 1/08* (2021.01)

(52) U.S. Cl.
CPC ............... *G01K 3/005* (2013.01); *G01K 1/08* (2013.01)

(58) Field of Classification Search
CPC ................................. G01K 3/005; G01K 1/08
USPC ........................................................ 374/163
See application file for complete search history.

(56) References Cited

U.S. PATENT DOCUMENTS

| 2010/0138068 | A1 | 6/2010 | Puniani | |
| 2019/0277711 | A1* | 9/2019 | Rud | G01K 1/16 |
| 2020/0103287 | A1* | 4/2020 | Rud | G01K 1/14 |

FOREIGN PATENT DOCUMENTS

| CN | 101080631 B | * | 3/2012 | ........... G01N 27/048 |
| CN | 104748889 A | * | 7/2015 | ............. G01K 1/143 |
| CN | 112858903 A | * | 5/2021 | ............. G01D 21/02 |
| DE | 102007038060 A1 | | 2/2009 | |
| DE | 102015000728 A1 | * | 7/2016 | ............... G01K 1/20 |
| WO | WO 2018105764 A1 | | 6/2018 | |

OTHER PUBLICATIONS

Translation of CN101080631B (Year: 2018).*
Translation of WO2018105764A1.*

* cited by examiner

*Primary Examiner* — Mirellys Jagan
(74) *Attorney, Agent, or Firm* — Leydig, Voit & Mayer, Ltd.

(57) ABSTRACT

A temperature determination device includes: a temperature sensor connectable to a process device at a connection position and for acquiring temperature data; and an environmental sensor for monitoring an environment in a region of the connection position and acquiring environmental data for the region of the connection position. The temperature determination device utilizes the temperature data and the environmental data with respect to a determination of a temperature of the process device.

12 Claims, 2 Drawing Sheets

TEMPERATURE DETERMINATION DEVICE

CROSS-REFERENCE TO PRIOR APPLICATION

Priority is claimed to European Patent Application No. EP 19 215 337.7, filed on Dec. 11, 2019, the entire disclosure of which is hereby incorporated by reference herein.

FIELD

The present invention relates to a temperature determination device.

BACKGROUND

Non-invasive temperature measurement products generally utilize surface mounted sensors, to measure for example the surface temperature of a pipe or vessel. To do so, sensor or sensors must be linked to the surface with an low thermal resistance. If this not achieved, the measurement result is significantly influenced, so that the accuracy as stated in the user datasheet is not reached. For that reason, the user manual suggests and describes the steps that are important to mount the product and its sensors correctly in order to achieve its maximum accuracy under all conditions. The steps can, for instance, involve preparing an even mounting surface below the sensor tip, but also to thermal insulate the measuring point with for example insulating wool. Furthermore, it is important to protect against other environmental influences like humidity or rain and mechanical impacts.

The accuracy within a dedicated range is especially important for future safety applications in a safety related rating (SIL) context of high importance. This can even be a broader range than that within the datasheet measuring accuracy, but applies in the safety context. Accurate and safe operation must either be provided by design, or safely determined that in an appropriate situation a failure generating diagnostic information is communicated to the host system. The more precise the determination works, the higher will be the safety related rating (SIL level).

User manuals and other customer documentation describes in detail the precautions that are to be taken in order to prevent damage from the device and allow for the specified high accurate measurement quality. Here, the protection of the sensor elements from humidity in connection with a thermal insulation is highlighted as crucial.

In reality though, there are influencing factors that allow humidity and other pollution to reach the sensor elements and cause errors to the temperature measurement. This can be due to the following reasons:
  Aging effects to the materials used for protection
  Mechanical stress and other external mechanical impacts
  Condensation through high temperature differences (especially in areas and countries with high environmental humidity)
  Incorrect mounting or maintenance work
  However, recognition of these influencing factors is low for the following reasons:
  Normally there is no redundant measuring point (as a comparable process value) to determine a deviation
  Even regular visual inspection would only take place on a weekly or daily basis
  The measuring point itself is usually hardly visible since this point is insulated with insulating wool against environmental influences Thus, to mitigate these influences appropriate mechanical design are provided to enable humidity and/or pollution protection, and to educate the installers and maintenance staff as appropriately as possible. However, in certain situations the effects of humidity and/or other pollution can go undetected, which can prevent or restricts the non-invasive technology from being used in certain safety applications.

There is a need to address this problem.

SUMMARY

In an embodiment, the present invention provides a temperature determination device, comprising: a temperature sensor configured to be connected to a process device at a connection position and to acquire temperature data; and an environmental sensor configured to monitor an environment in a region of the connection position and to acquire environmental data for the region of the connection position, wherein the temperature determination device is configured for utilization of the temperature data and the environmental data with respect to a determination of a temperature of the process device.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
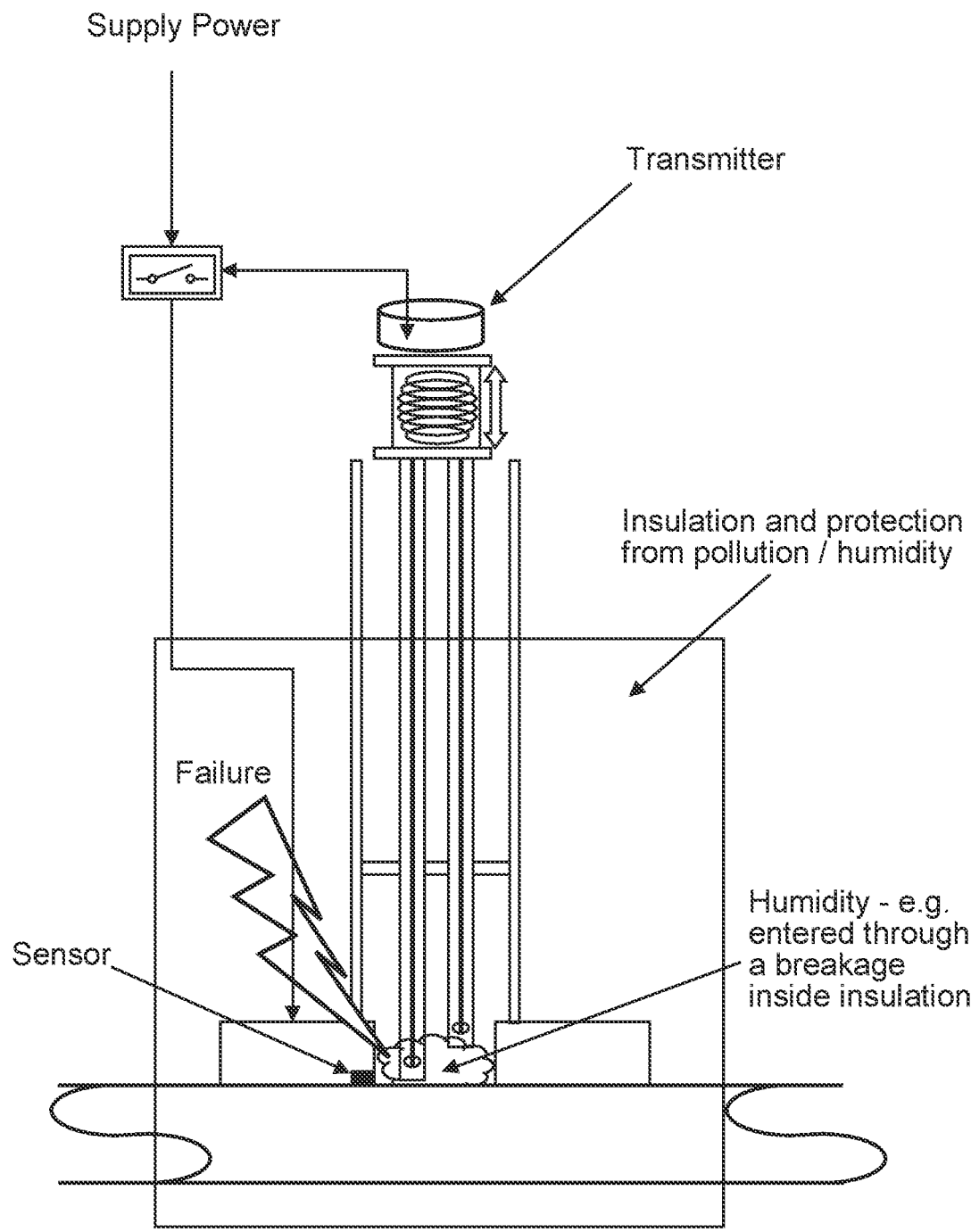
FIG. 1 shows an example of a temperature determination device.

In an embodiment, the present invention provides an improved temperature determination device.

In an aspect, there is provided a temperature determination device, comprising:
  a temperature sensor; and
  an environmental sensor.

The temperature sensor is configured to be connected to a process device at a connection position. The temperature sensor is configured to acquire temperature data. The environmental sensor is configured to monitor an environment in a region of the connection position. The environmental sensor is configured to acquire environmental data for the region of the connection position. The temperature determination device is configured to utilize the temperature data and the environmental data with respect to a determination of a temperature of the process device.

In an example, the environmental sensor is configured to acquire humidity data, and wherein the environmental data comprises the humidity data.

In an example, the environmental sensor is configured to determine a presence of liquid, and wherein the environmental data comprises the determined presence of liquid.

In an example, the environmental sensor is configured to determine a presence of water, and wherein the environmental data comprises the determined presence of water.

In an example, the environmental sensor is configured to acquire conductivity data and/or resistivity data, and wherein the environmental data comprises the conductivity data and/or the resistivity data.

In an example, the acquisition of the conductivity data and/or the resistivity data comprises a measurement of a conductance and/or a resistance between two points.

In an example, utilization of the temperature data and the environmental data with respect to the determination of the temperature of the process device the temperature, comprises a determination if the acquired temperature data are useable with respect to the determination of the temperature of the process device, wherein the determination comprises utilization of the environmental data.

In an example, utilization of the temperature data and the environmental data with respect to the determination of the temperature of the process device the temperature, comprises a cessation in transmission of the acquired temperature data and/or a cessation in transmission of the determined temperature comprising utilization of the environmental data.

In an example, utilization of the temperature data and the environmental data with respect to the determination of the temperature of the process device the temperature, comprises an issuance of an alarm signal comprising utilization of the environmental data.

In an example, the temperature determination device is configured to transmit the environmental data.

In an example, the temperature determination device is configured to transmit the temperature data.

In an example, utilization of the temperature data and the environmental data with respect to the determination of the temperature of the process device the temperature, comprises a determination if the environmental data exceed a threshold value for the associated temperature data.

The above aspects and examples will become apparent from and be elucidated with reference to the embodiments described hereinafter.

Figure 2:
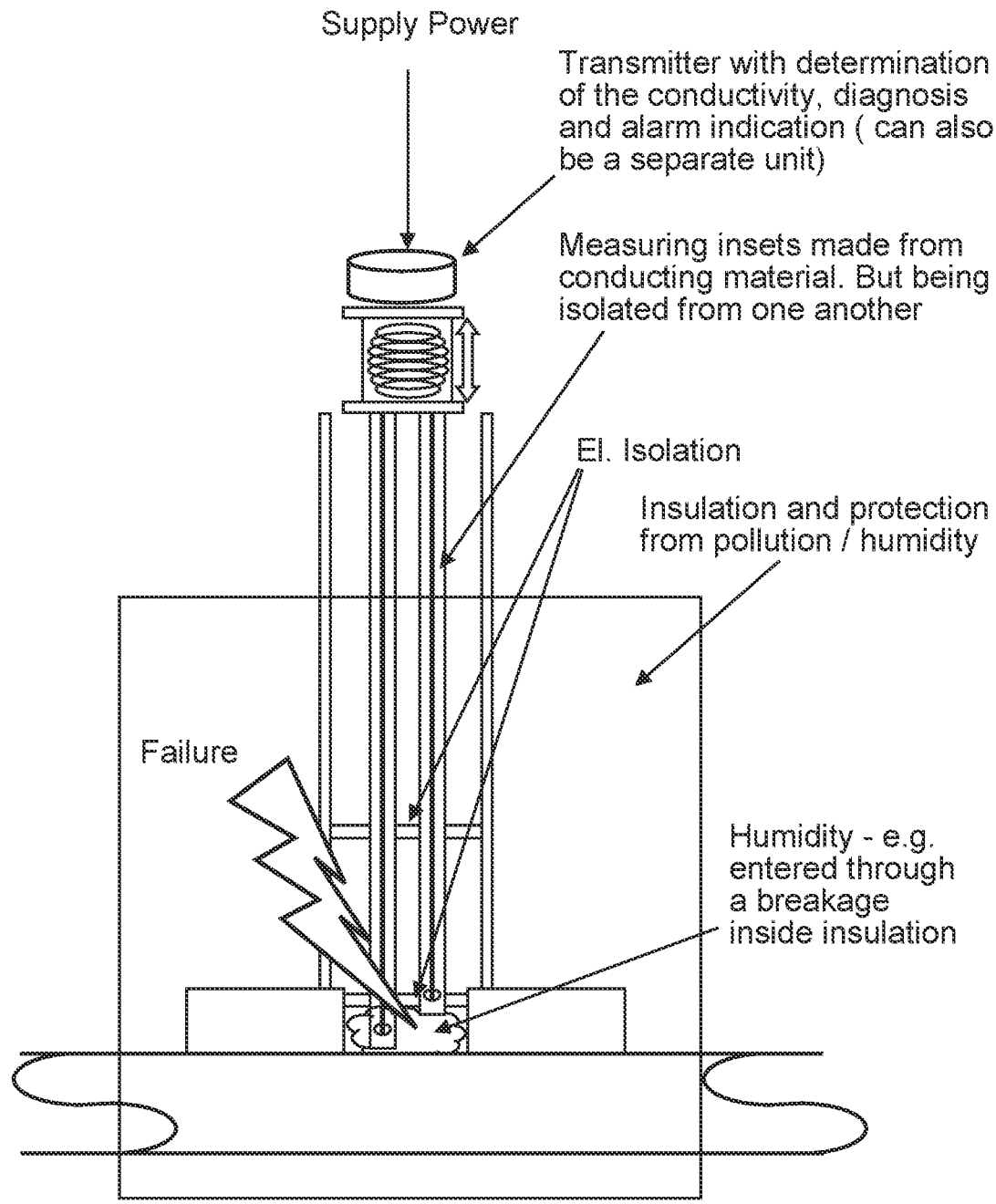
FIG. 2 shows an example of a temperature determination device.

FIGS. 1-2 relate to a temperature determination device. In an example, the temperature determination device comprises a temperature sensor, and an environmental sensor. The temperature sensor is configured to be connected to a process device at a connection position. The temperature sensor is configured to acquire temperature data. The environmental sensor is configured to monitor an environment in a region of the connection position. The environmental sensor is configured to acquire environmental data for the region of the connection position. The temperature determination device is configured to utilize the temperature data and the environmental data with respect to a determination of a temperature of the process device.

According to an example, the environmental sensor is configured to acquire humidity data, and wherein the environmental data comprises the humidity data.

In an example, the environmental sensor is configured to determine a degree or amount of humidity.

According to an example, the environmental sensor is configured to determine a presence of liquid, and wherein the environmental data comprises the determined presence of liquid.

In an example, the environmental sensor is configured to determine a degree or amount of liquid.

According to an example, the environmental sensor is configured to determine a presence of water, and wherein the environmental data comprises the determined presence of water.

In an example, the environmental sensor is configured to determine a degree or amount of liquid.

According to an example, the environmental sensor is configured to acquire conductivity data and/or resistivity data, and wherein the environmental data comprises the conductivity data and/or resistivity data.

According to an example, the acquisition of the conductivity data and/or the resistivity data comprises a measurement of a conductance and/or a resistance between two points.

According to an example, utilization of the temperature data and the environmental data with respect to the determination of the temperature of the process device the temperature, comprises a determination if the acquired temperature data are useable with respect to the determination of the temperature of the process device, wherein the determination comprises utilization of the environmental data.

According to an example, utilization of the temperature data and the environmental data with respect to the determination of the temperature of the process device the temperature, comprises a cessation in transmission of the acquired temperature data and/or a cessation in transmission of the determined temperature comprising utilization of the environmental data.

According to an example, utilization of the temperature data and the environmental data with respect to the determination of the temperature of the process device the temperature, comprises an issuance of an alarm signal comprising utilization of the environmental data.

According to an example, the temperature determination device is configured to transmit the environmental data.

According to an example, the temperature determination device is configured to transmit the temperature data.

According to an example, utilization of the temperature data and the environmental data with respect to the determination of the temperature of the process device the temperature, comprises a determination if the environmental data exceed a threshold value for the associated temperature data.

Thus, an arrangement is provided for the determination of humidity on surface mounted sensors for non-invasive measurement and generation of a diagnostic information for safety applications.

It has been established that humidity, or other forms of pollution or unwanted material, close to the temperature sensor tips is problematic because this changes the thermal behavior of the sensor and leads to an incorrect calculation result from the non-invasive process value calculation (especially under dynamic process value changes). The inventors have found that changes to the conductivity in this area can be determined and this can be an indicator of a humidity and/or water or other liquid that could lead to an incorrect temperature reading. Changes in resistance can also be utilized, and indeed dedicated humidity sensors can be utilized that operate in different principles to conductivity and resistance. This environmental sensor can then be connected transmitter electronics that can be used to generate diagnostics information and a signal to the upstream host system.

The determination and generation of a diagnostic information can also be separated from the instrument. In this case the information can be utilized to overload the input signal, e.g. when it is wired in series to the current loop. In case of a detected fault condition, it separates the transmitter electronics and interrupts the loop current signal (0 mA) which is a valid alarm current, but it may also set an other alarm current>0 mA<4 mA (e.g. 3,6 mA). Thus, either an alarm signal is provided or the transmitter stops sending—incorrect—temperature data, of both of these effects can be provided.

FIGS. 1 and 2 show exemplar embodiments of the temperature determination device.

In FIG. 1, humidity or pollution detection is provided close to temperature sensor tip(s). The humidity sensor is located close to the area that accommodates the sensor tips, and measures for instance conductivity between two points. The sensor is either connected to the transmitter where the diagnostic information is determined, or the sensor is connected to an independent unit, that is connected to the transmitter current loop that can manipulate its loop current (e.g. simple interruption with 0 mA loop current or another valid alarm signal).

In FIG. 2, humidity or pollution detection is provided close to temperature sensor tip(s). The humidity sensor is realized from the two measuring insets that are made from conducting material being isolated one from the other. Humidity or other conductive pollution can be measured by a determination of the resistance between the two insets. Diagnostics can be built from this information, generating an alarm information. Diagnostic measurement can be carried inside the transmitter or at a separated unit. Diagnostics can be distributed to an upstream host system via communication protocols (e.g. HART, PA, FF, APL, etc.)

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A temperature determination device, comprising:
a temperature sensor configured to be connected to a process device at a connection position and to acquire temperature data; and
an environmental sensor configured to monitor an environment in a region of the connection position and to acquire environmental data for the region of the connection position,
wherein the environmental sensor is configured to acquire conductivity data and/or resistivity data, and wherein the environmental data comprises changes in the conductivity data and/or changes in the resistivity data,
wherein the temperature determination device is configured for utilization of the temperature data and the environmental data with respect to a determination of a temperature of the process device, and
wherein the utilization of the temperature data and the environmental data with respect to the determination of the temperature of the process device comprises a cessation in a transmission of the acquired temperature data and/or of the determined temperature comprising utilization of the environmental data.

2. The temperature determination device according to claim 1, wherein the environmental sensor is configured to acquire humidity data, and
wherein the environmental data comprises the humidity data.

3. The temperature determination device according to claim 1, wherein the acquisition of the conductivity data and/or the resistivity data comprises a measurement of a conductance and/or a resistance between two points.

4. The temperature determination device according to claim 1, wherein the utilization of the temperature data and the environmental data with respect to the determination of the temperature of the process device comprises determining whether the acquired temperature data are useable with respect to the determination of the temperature of the process device, and
wherein the determination of the temperature of the process device comprises utilization of the environmental data.

5. The temperature determination device according to claim 1, wherein utilization of the temperature data and the environmental data with respect to the determination of the temperature of the process device comprises an issuance of an alarm signal comprising utilization of the environmental data.

6. The temperature determination device according to claim 1, wherein the temperature determination device is configured to transmit the environmental data.

7. The temperature determination device according to claim 1, wherein the temperature determination device is configured to transmit the temperature data.

8. The temperature determination device according to claim 1, wherein utilization of the temperature data and the environmental data with respect to the determination of the temperature of the process device comprises determining whether the environmental data exceeds a threshold value for associated temperature data.

9. The temperature determination device according to claim 1, wherein the environmental sensor is configured to determine a presence of liquid, and
wherein the environmental data comprises the determined presence of liquid.

10. The temperature determination device according to claim 9, wherein the environmental sensor is configured to determine a presence of water, and
wherein the environmental data comprises the determined presence of water.

11. The temperature determination device according to claim 1, wherein the changes in the conductivity and/or changes in the resistivity data indicates the presence of humidity and/or water or other liquid in the environment in the region of the connection position.

12. The temperature determination device according to claim 11, wherein the presence of humidity and/or water or other liquid leads to an incorrect temperature reading.

* * * * *